US012664243B2

(12) United States Patent
Singal et al.

(10) Patent No.: US 12,664,243 B2
(45) Date of Patent: Jun. 23, 2026

(54) SYSTEMS AND METHODS FOR PROVIDING SHARED ACCESS TO PHYSICAL ASSETS USING BIOMETRICS

(71) Applicant: JPMORGAN CHASE BANK, N.A., New York, NY (US)

(72) Inventors: Ashok Singal, Henderson, NV (US); Dan Skowronek, Prosper, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 64 days.

(21) Appl. No.: 18/639,321

(22) Filed: Apr. 18, 2024

(65) Prior Publication Data

US 2025/0328619 A1     Oct. 23, 2025

(51) Int. Cl.
*G06F 21/32*          (2013.01)

(52) U.S. Cl.
CPC ...... *G06F 21/32* (2013.01); *G06F 2221/2111* (2013.01); *G06F 2221/2115* (2013.01); *G06F 2221/2117* (2013.01); *G06F 2221/2137* (2013.01)

(58) Field of Classification Search
CPC .............. G06F 1/32; G06F 2221/2111; G06F 2221/2115; G06F 2221/2117; G06F 2221/2137
USPC ........................................................ 713/186
See application file for complete search history.

(56) References Cited

U.S. PATENT DOCUMENTS

| | | | | |
|---|---|---|---|---|
| 10,692,316 | B2 * | 6/2020 | Clouser | .............. G06Q 10/0832 |
| 12,100,041 | B1 * | 9/2024 | Billman | ................... G09B 5/06 |
| 2014/0337041 | A1 * | 11/2014 | Madden | ................ G16H 20/00 |
| | | | | 705/2 |
| 2017/0069148 | A1 * | 3/2017 | Gilbertson | ............. G07C 9/257 |
| 2017/0076274 | A1 * | 3/2017 | Royyuru | ................ G06Q 20/18 |
| 2020/0280560 | A1 * | 9/2020 | Xu | ....................... H04L 63/0861 |
| 2021/0357483 | A1 * | 11/2021 | Sharma | ................... G06F 21/32 |
| 2021/0374744 | A1 * | 12/2021 | Mclachlan | ............ H04L 63/102 |
| 2023/0186307 | A1 * | 6/2023 | Park | ....................... G06N 3/045 |
| | | | | 705/44 |
| 2023/0410069 | A1 * | 12/2023 | Montenegro | ........... G10L 15/22 |

* cited by examiner

*Primary Examiner* — David P Zarka
(74) *Attorney, Agent, or Firm* — GREENBERG TRAURIG LLP

(57)          ABSTRACT

A method may include: an access control computer program receiving a third-party registration comprising a biometric from a third party; the access control computer program receiving an asset owner registration comprising an identification of a physical asset, an identification of a physical asset access control device that controls access to the physical asset, and an identification of the third party to access the physical asset; the access control computer program receiving, from the physical asset access control device, a biometric from the third party; the access control computer program comparing the biometric received from the physical asset access control device to the biometric in the third-party registration; and the access control computer program instructing the physical asset access control device to grant access to the physical asset in response to the biometric received from the physical asset access control device matching the biometric in the third-party registration.

20 Claims, 4 Drawing Sheets

SYSTEMS AND METHODS FOR PROVIDING SHARED ACCESS TO PHYSICAL ASSETS USING BIOMETRICS

BACKGROUND OF THE INVENTION

1. Field of the Invention

Embodiments generally relate to systems and methods for providing shared access to physical assets using biometrics.

2. Description of the Related Art

It is important to control access to one's physical assets. This may include access to an area, such as a backyard, a house, a garage, etc. or to an object, such as a car, a van, a plane, etc. Oftentimes, physical asset owners may grant temporary access to an individual to access or use the physical asset, but in doing so, may inadvertently provide access to individuals other than the intended individual, or may provide access at undesired times.

SUMMARY OF THE INVENTION

Systems and methods for providing shared access to physical assets using biometrics are disclosed. In one embodiment, a method may include: (1) receiving, by an access control computer program executed by a backend electronic device, a third-party registration comprising a biometric from a third party; (2) receiving, by the access control computer program, an asset owner registration comprising an identification of a physical asset, an identification of a physical asset access control device that controls access to the physical asset, and an identification of the third party to access the physical asset; (3) receiving, by the access control computer program and from the physical asset access control device, a biometric from the third party; (4) comparing, by the access control computer program, the biometric received from the physical asset access control device to the biometric in the third-party registration; and (5) instructing, by the access control computer program, the physical asset access control device to grant access to the physical asset in response to the biometric received from the physical asset access control device matching the biometric in the third-party registration.

In one embodiment, the physical asset may include a restricted area, a vehicle, etc.

In one embodiment, the physical asset access control device may include a sensor to capture a biometric, a location tracking device, etc.

In one embodiment, the method may also include: notifying, by the access control computer program, asset owner in response to the biometric received from the physical asset access control device matching the biometric in the third-party registration; and receiving, by the access control computer program, approval to grant access from the asset owner before instructing the physical asset access control device to grant access to the physical asset.

In one embodiment, the asset owner registration further may include a condition on granting access to the physical asset. The condition may be a time-based condition, an access frequency-based condition, or a use-based condition.

In one embodiment, the method may also include confirming, by the access control computer program, that the condition is met before instructing the physical asset access control device to grant access to the physical asset.

In one embodiment, the method may also include instructing, by the access control computer program, the access control device to grant access to the physical asset in response to the biometric received from the physical asset access control device not matching the biometric in the third-party registration or the condition not being met.

According to another embodiment, a system may include: a backend electronic device executing an access control computer program; a physical asset associated with a physical asset owner; a physical asset access control device that may be configured to control access to the physical asset; and an asset owner electronic device executing an asset owner computer program. The access control computer program receives a third-party registration comprising a biometric from a third party and receives an asset owner registration comprising an identification of the physical asset, an identification of the physical asset control device, and an identification of the third party to access the physical asset. The physical asset access control device receives a biometric from the third party and communicates the biometric to the access control computer program. The access control computer program compares the biometric received from the physical asset access control device to the biometric in the third-party registration, and instructs the physical asset access control device to grant access to the physical asset in response to the biometric received from the physical asset control device matching the biometric in the third-party registration.

In one embodiment, the physical asset may include a restricted area, a vehicle, etc.

In one embodiment, the physical asset access control device may include a sensor to capture a biometric, a location tracking device, etc.

In one embodiment, the access control computer program may notify the physical asset owner in response to the biometric received from the physical asset access control device matching the biometric in the third-party registration, and receives approval to grant access from the asset owner electronic device before instructing the physical asset access control device to grant access to the physical asset.

In one embodiment, the asset owner registration further may include a condition on granting access to the physical asset. The condition may be a time-based condition, an access frequency-based condition, or a use-based condition.

In one embodiment, the access control computer program may confirm that the condition is met before instructing the physical asset access control device to grant access to the physical asset.

In one embodiment, the access control computer program may instruct the physical asset access control device to grant access to the physical asset in response to the biometric received from the physical asset access control device not matching the biometric in the third-party registration or the condition not being met.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and for providing shared access to physical assets using biometrics are disclosed.

Figure 1:
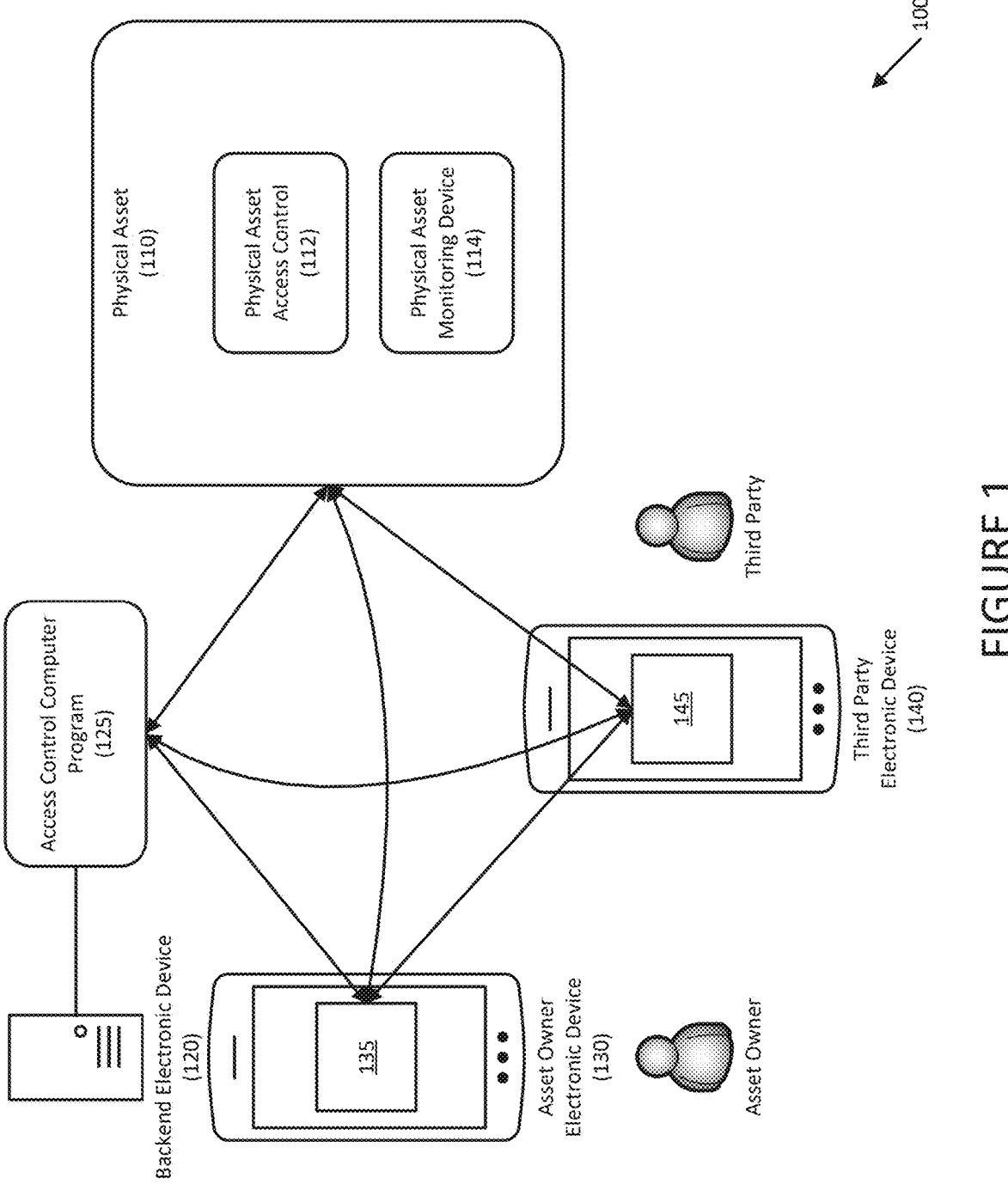
FIG. 1 depicts a system for providing shared access to physical assets using biometrics according to an embodiment.

Referring to FIG. 1, a system for providing shared access to physical assets using biometrics is disclosed according to an embodiment. System 100 may include physical asset 110, which may be an area (e.g., inside of building, house, storage area, a gated yard, etc.), a vehicle (e.g., a car, a boat, a plane, a motor home, etc.), electronic devices (e.g., Internet of Things devices such as laptops, computers, mobile phones, appliances, etc.

Physical asset 110 may include physical asset access control 112 and physical asset monitoring device 114. Physical asset access control 112 may be a gate, a door, an ignition, or any other suitable access control mechanism. Physical asset access control 112 may control access to physical asset by unlocking a gate, door, ignition, etc. Physical asset monitoring device 114 may be a biometric sensor (e.g., an imaging device, touchpad, microphone, combinations thereof, etc.) and may receive a biometric from a third party seeking to access physical asset 110. Examples of biometrics may include face scans, eye scans, fingerprints, palm prints, voice prints, etc.

Physical asset monitoring device 114 may communicate the biometric(s) to access control computer program 125, which may be executed by backend electronic device 120. It may further communicate a status of physical asset access control 112 to access control computer program 125.

An asset owner may be associated with asset owner electronic device 130, which may be a computer (e.g., workstation, desktop, laptop, notebook, tablet, etc.), a smart device (e.g., smart watch, smart phone, etc.), an Internet of Things (IoT) appliance, etc. Asset owner electronic device 130 may execute access owner computer program 135, which may be a computer program or an application. Using access owner computer program 135, the access owner may permit or revoke access to physical asset 110, may set conditions on the access to physical asset 110 (e.g., times of day, number of accesses per day/week/month, number of hours of access, number of miles of access, geofences, etc.). Access owner computer program 135 may communicate with access control computer program 125 to provide such information, and to receive information on accesses to physical asset 110.

Access owner computer program 135 may be biometrically enabled.

A third party may be associated with third party electronic device 140, which may also be a computer (e.g., workstation, desktop, laptop, notebook, tablet, etc.), a smart device (e.g., smart watch, smart phone, etc.), an Internet of Things (IoT) appliance, etc. The third party may register a biometric with access control computer program 125 using third party computer program 145.

In one embodiment, the biometric may be transmitted to backend electronic device 120, where biometric may be one-way transformed into an irreversible biometric template that cannot be reverse engineered back to the raw biometric file.

In one embodiment, once the third party has accessed physical asset 110, access control computer program may notify asset owner electronic device 130 so that the asset owner may complete a payment to the third party using any suitable mechanism. In one embodiment, payment may be automatically triggered by the third-party access.

Figure 2A:
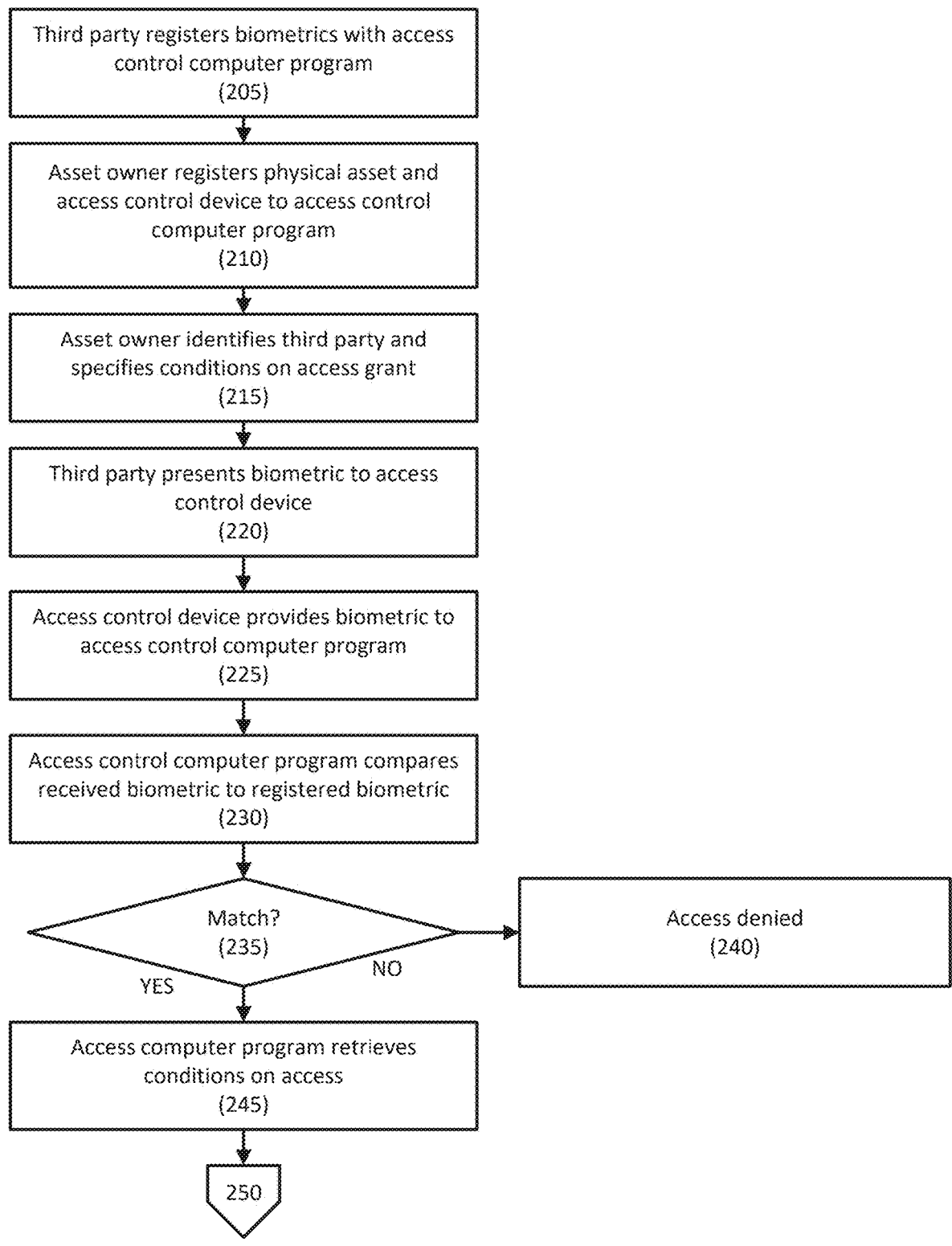
FIGS. 2A and 2B depict a method for providing shared access to physical assets using biometrics according to an embodiment.
Figure 2B:
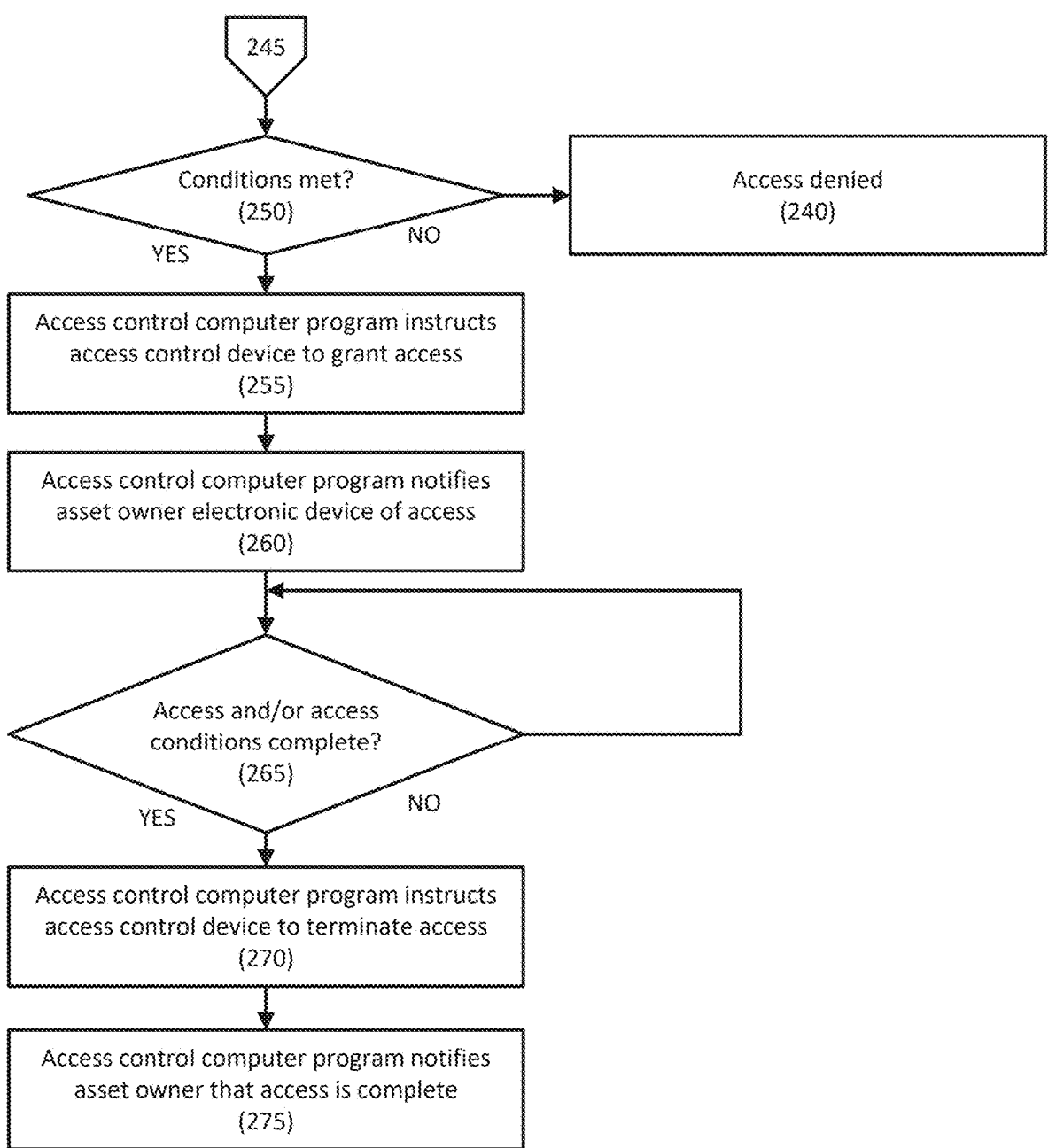

Referring to FIGS. 2A and 2B, a method providing shared access to physical assets using biometrics is disclosed according to an embodiment.

In step 205, a third party may register a biometric (e.g., image, eye, fingerprint, palm print, voice, etc.) with an access control computer program. In one embodiment, the third party may register using a third-party electronic device.

In step 210, an asset owner for a physical asset may register the physical asset and an access control device for the physical asset with the access control computer program. The asset owner may also register an asset monitoring device, such as a camera, a location tracker (e.g., GPS system), etc. for monitoring the physical asset.

In step 215, the asset owner may identify a third party to grant access to the physical asset and may also specify conditions on the access grant. For example, the asset owner may identify a third party that has registered with the access control computer program, or may request that a registration link be sent to an unregistered third party.

The asset owner may also identify conditions, such as a time-based condition (e.g., a day or time of the week, a time limit on the access, etc.), an access frequency-based condition (e.g., a number of accesses for a given time period, such as a day, week, month, etc.), a use-based condition (e.g., a mileage limit on the access, a distance limit on the access, etc.), etc. Any other suitable conditions may be used as is necessary and/or desired.

The access control computer program may store the conditions in a database and may associate them with a third party.

In step 220, a third party may present a biometric to an access control device at a physical asset. For example, the third party may present his or her face, an eye, a fingerprint, a palm print, or may speak to the access control device. The access control device may be a camera, a touch-sensitive device, a microphone, etc.

In step 225, the access control device may provide the biometric to the access control computer program.

In step 230, the access control computer program may compare the received biometric to registered biometrics for third parties that have been granted access to the physical asset.

In step 235, if the received biometric does not match the registered biometric, in step 240, access is denied. The access control computer program may cause the access control device to present a message to the third party informing the third party of such.

In one embodiment, the access control computer program may notify the asset owner. The access owner may then grant access to the third party if desired.

If the received biometric matches the registered biometric, in step 245, the access computer program may retrieve the conditions on access for the third party.

In step 250, if the access conditions are not met (e.g., incorrect day/time, number of accesses, etc.), in step 240, access is denied. The access control computer program may cause the access control device to present a message to the third party informing the third party of such.

In one embodiment, the access control computer program may notify the asset owner. The access owner may then grant access to the third party if desired.

If the conditions are met, in step 255, the access control computer program may instruct the access control device to grant access. For example, the access control computer program may send a control signal to the access control device that causes the access control device to open a gate, unlock a door, unlock an ignition, etc.

In step 260, the access control computer program may notify the asset owner electronic device of the access. For example, the access control computer program may send the asset owner an image of the third party, a time/date of access, etc.

In step 265, once the access and/or access are complete (e.g., the access time has expired), or the third party completes access, in step 270, the access control computer program may instruct the access control device to terminate access. For example, the access control computer program may send a control signal to the access control device that causes the access control device to lock the gate, door, etc. It may cause the access control device to inform the third party that access is being terminated.

In another embodiment, the access control computer program may automatically note when the asset is returned on time, returned late, etc. Embodiments may use an artificial intelligence model to track and rate the usage of the asset. The access control computer program may provide recommendations on whether to continue to grant access, etc. as is necessary and/or desired.

In step 275, the access control computer program may notify the asset owner that access is complete. The asset owner may then take any additional action, such as sending a payment to the third party, as is necessary and/or desired.

At any point, the asset owner may remove the third party from having access, may modify the conditions on the access, etc.

In one embodiment, the access control computer program may provide recommendations on using certain third parties based on their historical asset to the asset. For example, if a gardener has good reviews, the access control computer program may allow a user to share the gardener's information with others (e.g., neighbors, friends, etc.) that may also participate in the access control system. The others may also rate the third parties, thereby creating a community list of third parties with ratings.

In one embodiment, a third party's biometric credentials may also be shared with others such that the third party may not need to enroll in order to access other user's assets.

Figure 3:
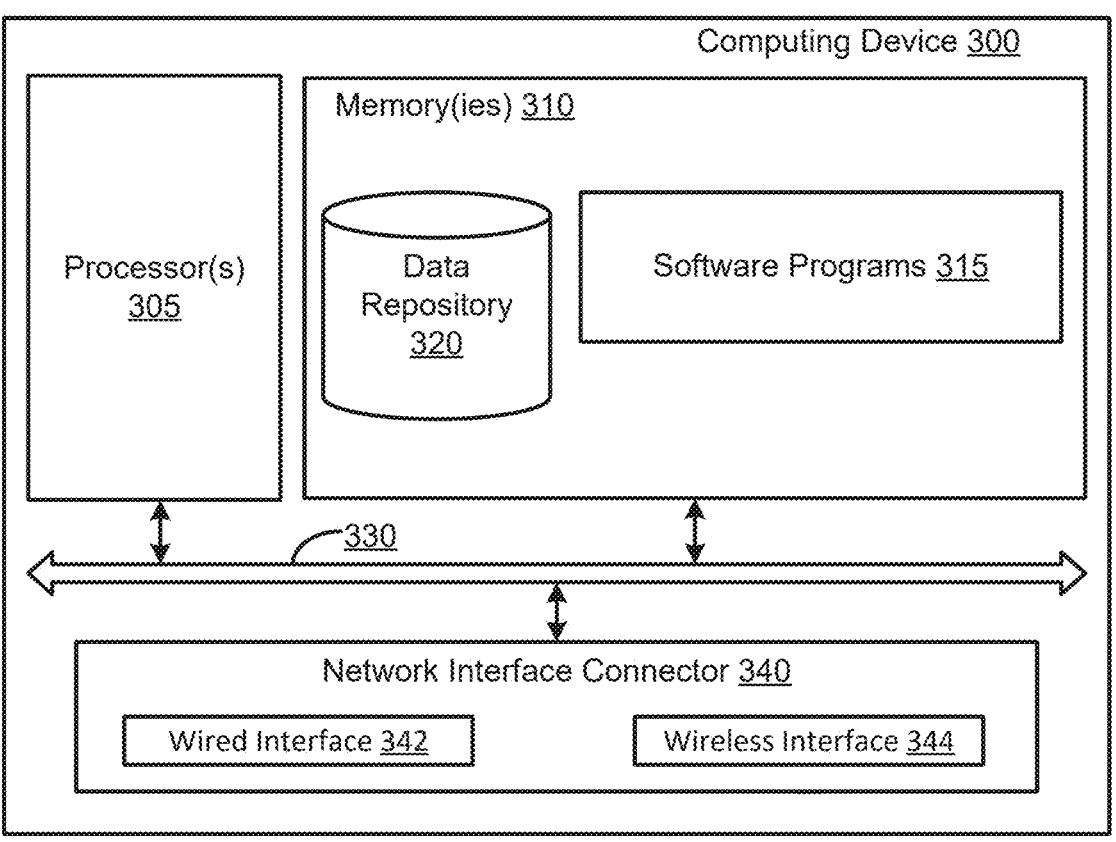
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments.

As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by an access control computer program executed by a backend electronic device, a third-party registration comprising a biometric from a third party;

receiving, by the access control computer program, an asset owner registration comprising an identification of a physical asset, an identification of a physical asset access control device that controls access to the physical asset, and an identification of the third party to access the physical asset;

receiving, by the access control computer program and from the physical asset access control device, a biometric from the third party;

comparing, by the access control computer program, the biometric received from the physical asset access control device to the biometric in the third-party registration;

determining, by the access control computer program, that the physical asset access control device is located within a predefined geofence associated with the physical asset; and instructing, by the access control computer program, the physical asset access control device to grant access to the physical asset in response to the biometric received from the physical asset access control device matching the biometric in the third-party registration by actuating a mechanical lock of the physical asset using a single-use unlock credential that expires after a time window, in response to both (i) the biometric received from the physical asset access control device matching the biometric in the third-party registration and (ii) the determining that the physical asset access control device is located within the predefined geofence.

2. The method of claim 1, wherein the physical asset comprises a restricted area.

3. The method of claim 1, wherein the physical asset comprises a vehicle.

4. The method of claim 1, wherein the physical asset access control device comprises a sensor to capture a biometric.

5. The method of claim 1, wherein the physical asset access control device comprises a location tracking device.

6. The method of claim 1, further comprising:

notifying, by the access control computer program, the asset owner in response to the biometric received from the physical asset access control device matching the biometric in the third-party registration; and receiving, by the access control computer program, approval to grant access from the asset owner before instructing the physical asset access control device to grant the access to the physical asset.

7. The method of claim 1, wherein the asset owner registration further comprises a condition on granting access to the physical asset.

8. The method of claim 7, wherein the condition is a time-based condition, an access frequency-based condition, or a use-based condition.

9. The method of claim 7, further comprising:

confirming, by the access control computer program, that the condition is met before instructing the physical asset access control device to grant the access to the physical asset.

10. The method of claim 7, further comprising:

instructing, by the access control computer program, the access control device to grant the access to the physical asset in response to the biometric received from the physical asset access control device not matching the biometric in the third-party registration or the condition not being met.

11. A system, comprising:

a backend electronic device executing an access control computer program;

a physical asset associated with a physical asset owner;

a physical asset access control device that is configured to control access to the physical asset; and an asset owner electronic device executing an asset owner computer program;

wherein:

the access control computer program receives a third-party registration comprising a biometric from a third party;

the access control computer program receives an asset owner registration comprising an identification of the physical asset, an identification of the physical asset control device, and an identification of the third party to access the physical asset;

the physical asset access control device receives a biometric from the third party and communicates the biometric to the access control computer program;

the access control computer program compares the biometric received from the physical asset access control device to the biometric in the third-party registration;

the access control computer program determines that the physical asset access control device is located within a predefined geofence associated with the physical asset; and the access control computer program instructs the physical asset access control device to grant access to the physical asset in response to the biometric received from the physical asset control device matching the biometric in the third-party registration by actuating a mechanical lock of the physical asset using a single-use unlock credential that expires after a time window, in response to both (i) the biometric received from the physical asset access control device matching the biometric in the third-party registration and (ii) the determining that the physical asset access control device is located within the predefined geofence.

12. The system of claim 11, wherein the physical asset comprises a restricted area.

13. The system of claim 11, wherein the physical asset comprises a vehicle.

14. The system of claim 11, wherein the physical asset access control device comprises a sensor to capture a biometric.

15. The system of claim 11, wherein the physical asset access control device comprises a location tracking device.

16. The system of claim 11, wherein the access control computer program notifies the physical asset owner in response to the biometric received from the physical asset access control device matching the biometric in the third-party registration, and receives approval to grant the access from the asset owner electronic device before instructing the physical asset access control device to grant access to the physical asset.

17. The system of claim 11, wherein the asset owner registration further comprises a condition on granting access to the physical asset.

18. The system of claim 17, wherein the condition is a time-based condition, an access frequency-based condition, or a use-based condition.

19. The system of claim 17, wherein the access control computer program confirms that the condition is met before instructing the physical asset access control device to grant the access to the physical asset.

20. The system of claim 17, wherein the access control computer program instructs the physical asset access control device to grant the access to the physical asset in response to the biometric received from the physical asset access control device not matching the biometric in the third-party registration or the condition not being met.

\* \* \* \* \*